(12) United States Patent
Furuya et al.

(10) Patent No.: US 6,892,386 B2
(45) Date of Patent: May 10, 2005

(54) GUIDE SHAFT HEIGHT ADJUSTMENT MECHANISM AND DISC DRIVE EQUIPPED WITH THE ADJUSTMENT MECHANISM

(75) Inventors: Hitoshi Furuya, Kanagawa (JP); Hiroaki Yumitori, Kanagawa (JP); Takashi Sato, Tokyo (JP)

(73) Assignee: Mitsumi Electric Co. Ltd., Kanagawa (JP)

( * ) Notice: Subject to any disclaimer, the term of this patent is extended or adjusted under 35 U.S.C. 154(b) by 131 days.

(21) Appl. No.: 10/397,146

(22) Filed: Mar. 26, 2003

(65) Prior Publication Data

US 2003/0214899 A1 Nov. 20, 2003

(30) Foreign Application Priority Data

Mar. 26, 2002 (JP) ........................................ 2002-086587

(51) Int. Cl.[7] .............................................. G11B 17/30
(52) U.S. Cl. ...................................................... 720/675
(58) Field of Search ................................ 720/675, 676; 369/249, 259, 244, 236, 219, 44.16; 360/266.6, 267.1

(56) References Cited

U.S. PATENT DOCUMENTS

| | | | | |
|---|---|---|---|---|
| 5,764,618 A | * | 6/1998 | Kim ............................ | 720/675 |
| 5,768,248 A | * | 6/1998 | Lee ............................. | 720/675 |
| 5,889,755 A | | 3/1999 | Kim | |
| 5,995,478 A | * | 11/1999 | Park ........................... | 720/675 |
| 6,275,460 B1 | * | 8/2001 | Nakayama et al. ......... | 720/610 |
| 6,445,673 B2 | * | 9/2002 | Park ........................... | 720/675 |
| 2001/0022772 A1 | | 9/2001 | Moriyama | |

* cited by examiner

Primary Examiner—Angel Castro
(74) Attorney, Agent, or Firm—Patents+TMS, P.C.

(57) ABSTRACT

A guide shaft height adjustment mechanism (8) used in a disc drive includes: a chassis (43) comprised of a chassis base having a flat-plate shape and a hole; a guide shaft (77) for guiding an optical pick-up along a radial direction of an optical disc, the guide shaft having one end acting as a movable end and being mounted on the chassis base so that the movable end can be displaced in a direction perpendicular to the chassis base; an adjustment member (81) rotatably provided at the vicinity of the movable end of the guide shaft (77), the adjustment member (81) being formed by outsert molding at the position of the hole formed in the chassis base (43); and a biasing member (82) provided between the chassis base (43) and the guide shaft (77) at the vicinity of the adjustment member (81) for pushing the guide shaft (77) to a direction far away from the chassis (43). The adjustment member has an abutment surface (815) at the vicinity of the movable end of the guide shaft (77), the abutment surface faces the chassis base so that the guide shaft (77) is abutted thereto, and the abutment surface is formed so as to be inclined relative to the chassis base and along the circumferential direction of the adjustment member (81), in which the movable end of the guide shaft is in abutment with the abutment surface by the biasing force of the biasing member, and the distance between the movable end of the guide shaft and the base chassis can be adjusted by rotating the adjustment member.

18 Claims, 13 Drawing Sheets

GUIDE SHAFT HEIGHT ADJUSTMENT MECHANISM AND DISC DRIVE EQUIPPED WITH THE ADJUSTMENT MECHANISM

BACKGROUND OF THE INVENTION

1. Field of the Invention

The present invention is related to a guide shaft height adjustment mechanism and a disc drive equipped with the adjustment mechanism.

2. Description of the Prior Art

Disc drives are apparatuses for carrying out playback or recording/playback of optical discs such as a CD-ROM, a CD-R, a DVD and the like. A typical disc drive includes a box-shaped main body, and a disc tray which is movable between an optical disc loading position and an optical disc ejection position with respect to the main body. Further, an optical disc rotation drive mechanism which rotates an optical disc, an optical pick-up (optical head), and an optical pick-up moving mechanism which moves the optical pick-up in a radial direction of the optical disc are arranged on a chassis provided inside the main body.

The optical pick-up moving mechanism includes a guide shaft which guides the optical pick-up in a radial direction of the optical disc. The laser light emitted from the optical pick-up needs to be adjusted to direct perpendicular to the recording surface of the optical disc. For this reason, a height adjustment mechanism is provided on the guide shaft to make it possible to adjust the inclination (skew) of the optical pick-up by adjusting the height of the guide shaft.

A prior art guide shaft height adjustment mechanism includes an adjustment screw (bolt) screwed into a screw hole formed in the chassis, and a spring member which presses a guide shaft end portion on the under surface of a flange portion formed on the head of the adjustment screw. In this arrangement, the distance between the chassis and the flange portion is changed by rotating the adjustment screw, whereby the height of the guide shaft end portion is adjusted.

However, because a metal adjustment screw is required in this type of guide shaft height adjustment mechanism, there is a problem in that the cost of components is high. Further, there is also a problem in that a manual operation is required to rotate and screw the adjustment screw in the screw hole when assembling the mechanism.

SUMMARY OF THE INVENTION

It is an object of the present invention to provide a guide shaft height adjustment mechanism which can be assembled easily and manufactured at a low cost.

In order to achieve the object, the present invention is directed to a guide shaft height adjustment mechanism. The guide shaft height adjustment mechanism comprises: a chassis comprised of a chassis base having a flat-plate shape and a hole; a guide shaft for guiding an optical pick-up along a radial direction of an optical disc, the guide shaft having one end acting as a movable end and being mounted on the chassis base so that the movable end can be displaced in a direction perpendicular to the chassis base; an adjustment member rotatably provided at the vicinity of the movable end of the guide shaft, the adjustment member being formed by outsert molding at the position of the hole formed in the chassis base; and a biasing member provided between the chassis base and the guide shaft at the vicinity of the adjustment member for pushing the guide shaft to a direction far away from the chassis base. The adjustment member has an abutment surface at the vicinity of the movable end of the guide shaft, the abutment surface faces the chassis base so that the guide shaft is abutted thereto, and the abutment surface is formed so as to be inclined relative to the chassis base and extend along the circumferential direction of the adjustment member, in which the movable end of the guide shaft is in abutment with the abutment surface by the biasing force of the biasing member, and the distance between the movable end of the guide shaft and the chassis base can be adjusted by rotating the adjustment member.

In the present invention, it is preferred that the guide shaft has the other end which is also formed into a movable end, the adjustment member and the biasing member are also provided for the other movable end of the guide shaft so that the distance between each of the movable ends of the guide shaft and the chassis base can be adjusted.

Furthers it is also preferred that the abutment surface is formed into a substantially sector shape.

Furthermore, it is also preferred that the adjustment member is formed with a no abutment surface portion at a part of the circumferential direction thereof on which the abutment surface is not formed, in which by rotating the adjustment member to a position where the no abutment surface portion of the adjustment member is positioned on the side of the guide shaft, it is possible to obtain a state that the abutment surface does not interfere with the guide shaft.

Moreover, it is also preferred that the adjustment member has a flange-shaped abutment portion on which the abutment surface is formed.

Moreover, it is also preferred that the adjustment member is formed with an engaging part to which a jig is adapted to be engaged.

The guide shaft height adjustment mechanism as claimed in claim 1, further comprising a positioning member fixed on the chassis base for positioning a position of the movable end of the guide shaft in a direction parallel to the upper surface of the chassis base.

Moreover, it is also preferred that the positioning member is formed on the chassis base by outsert molding at the same time of the formation of the adjustment member.

Moreover, it is also preferred that the biasing member is a coil spring.

Another aspect of the present invention is directed to an optical disc drive having a function of playing back data recorded in an optical disc, which includes the guide shaft height adjustment mechanism as claimed in any one of claims 1 to 9.

The above and other objects, structures and advantages of the present invention will be more apparent when the following detailed description of the embodiments is considered in conjunction with the accompanied drawings.

DETAILED DESCRIPTION OF THE PREFERRED EMBODIMENTS

The preferred embodiments of a guide shaft height adjustment mechanism and a disc drive according to the present invention will now be described in detail with reference to the appended drawings.

Figure 1:
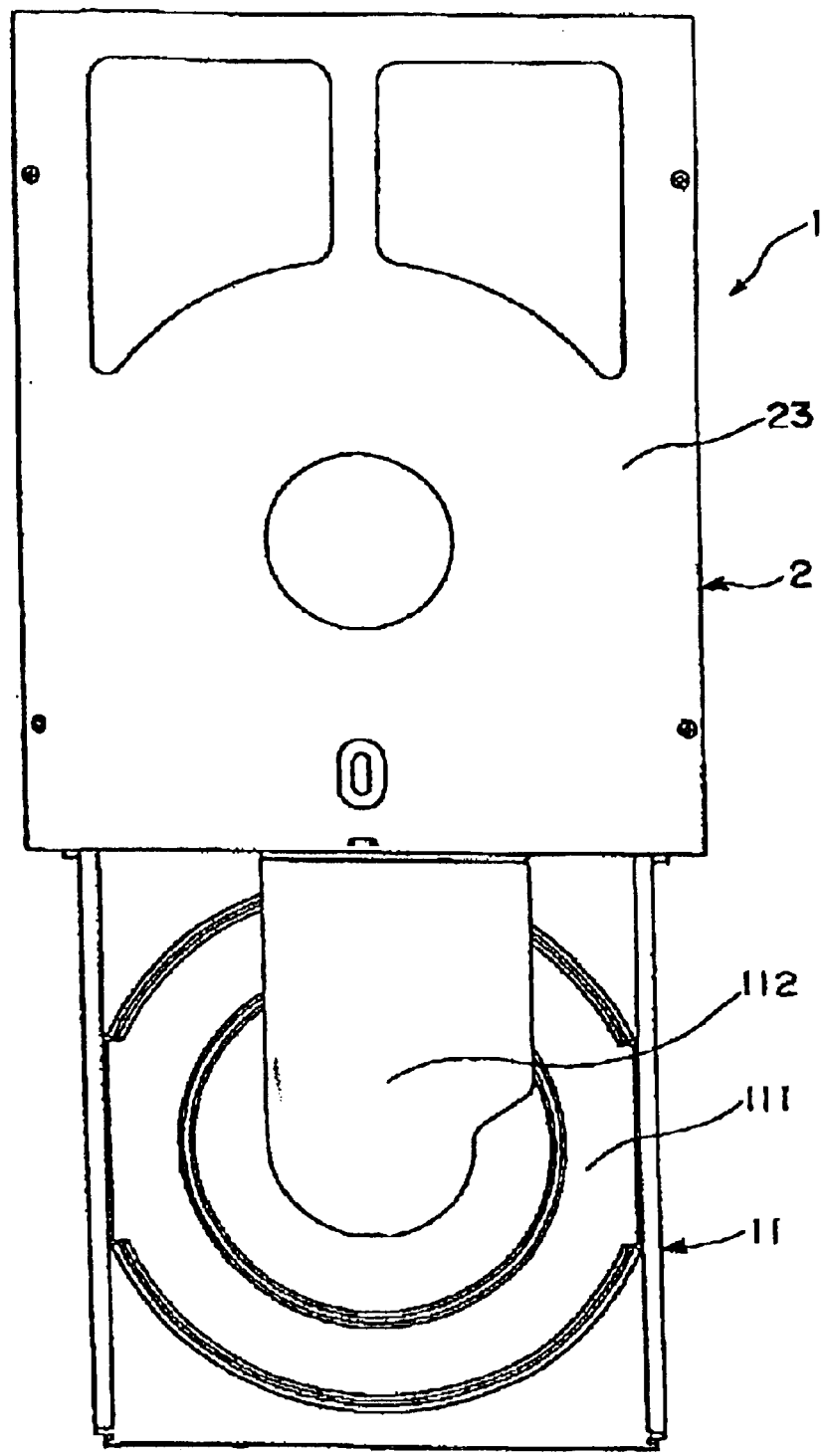
FIG. 1 is a plan view of an embodiment of a disc drive according to the present invention.
Figure 2:
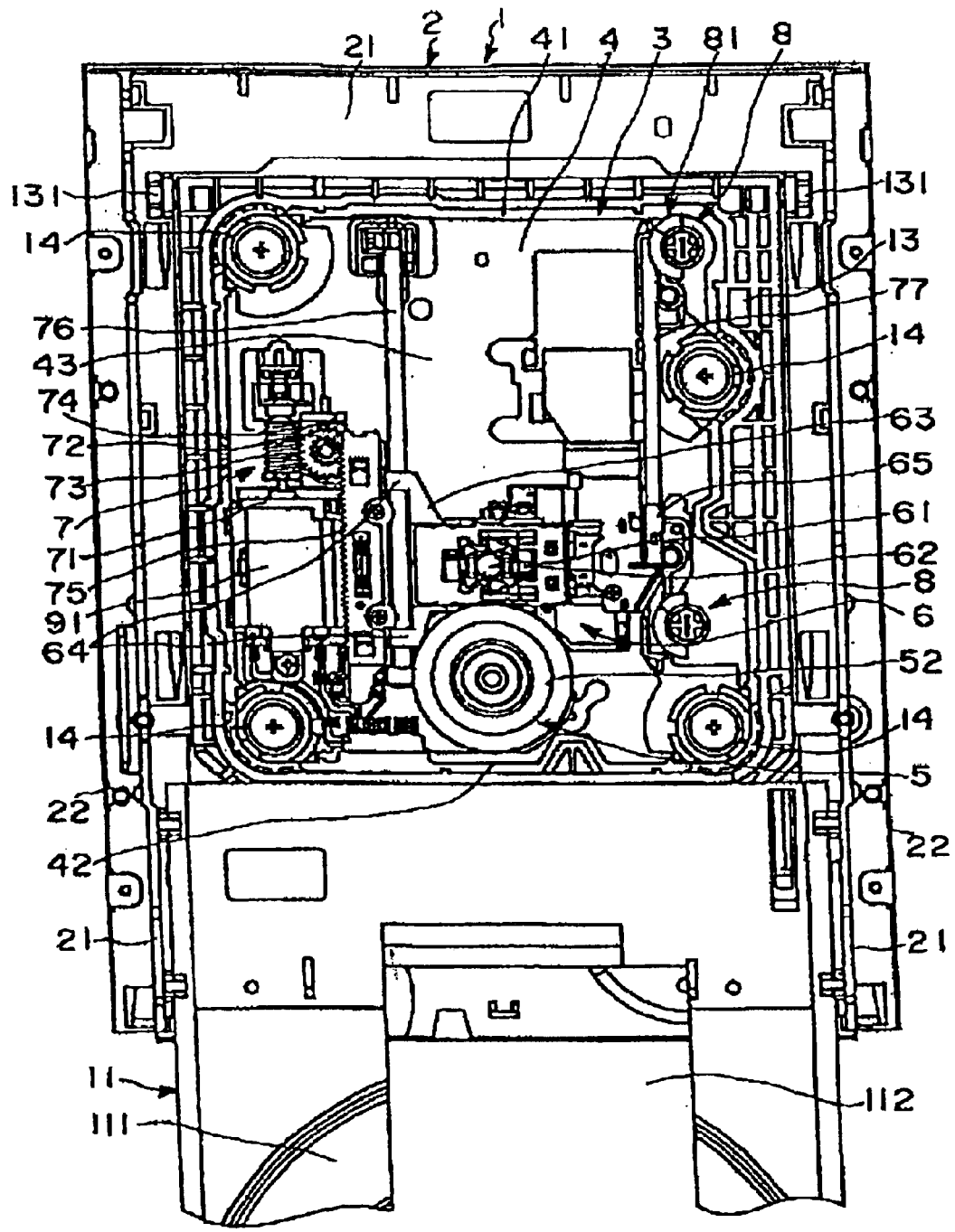
FIG. 2 is a plan view showing the disc drive of FIG. 1 in a state where the top plate has been removed.
Figure 3:
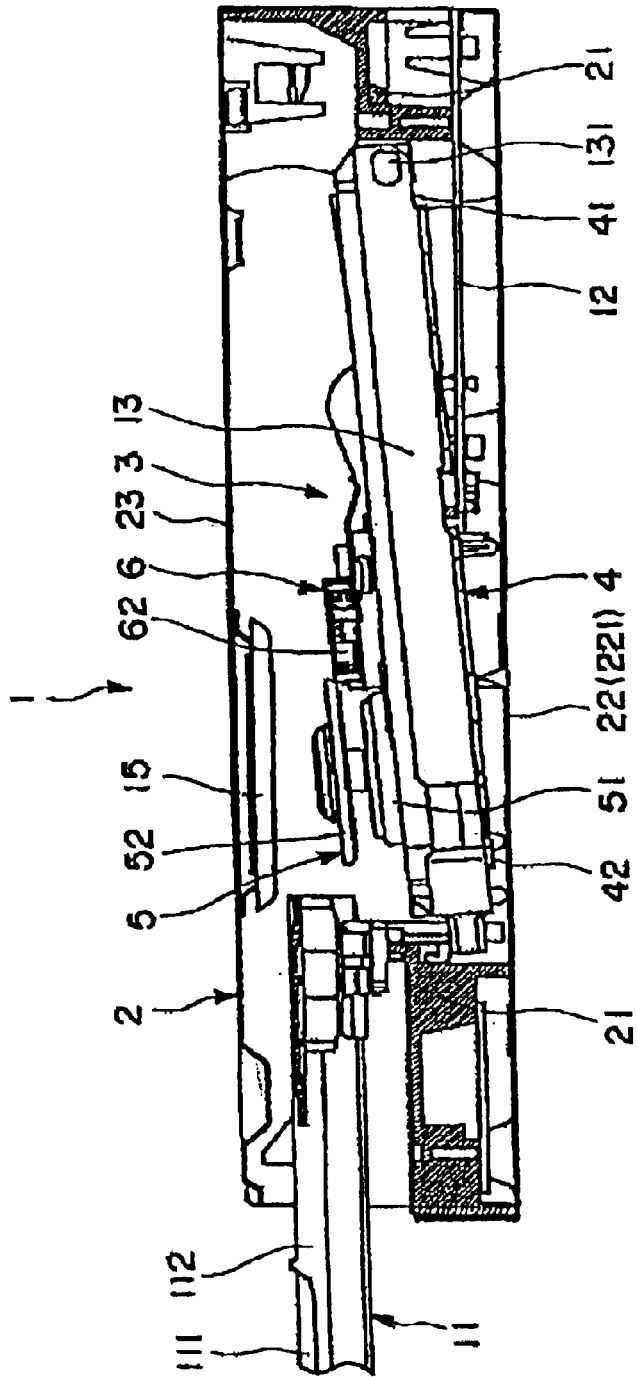
FIG. 3 is a cross-sectional side view of the disc drive shown in FIG. 1 which shows an ejection state.
Figure 4:
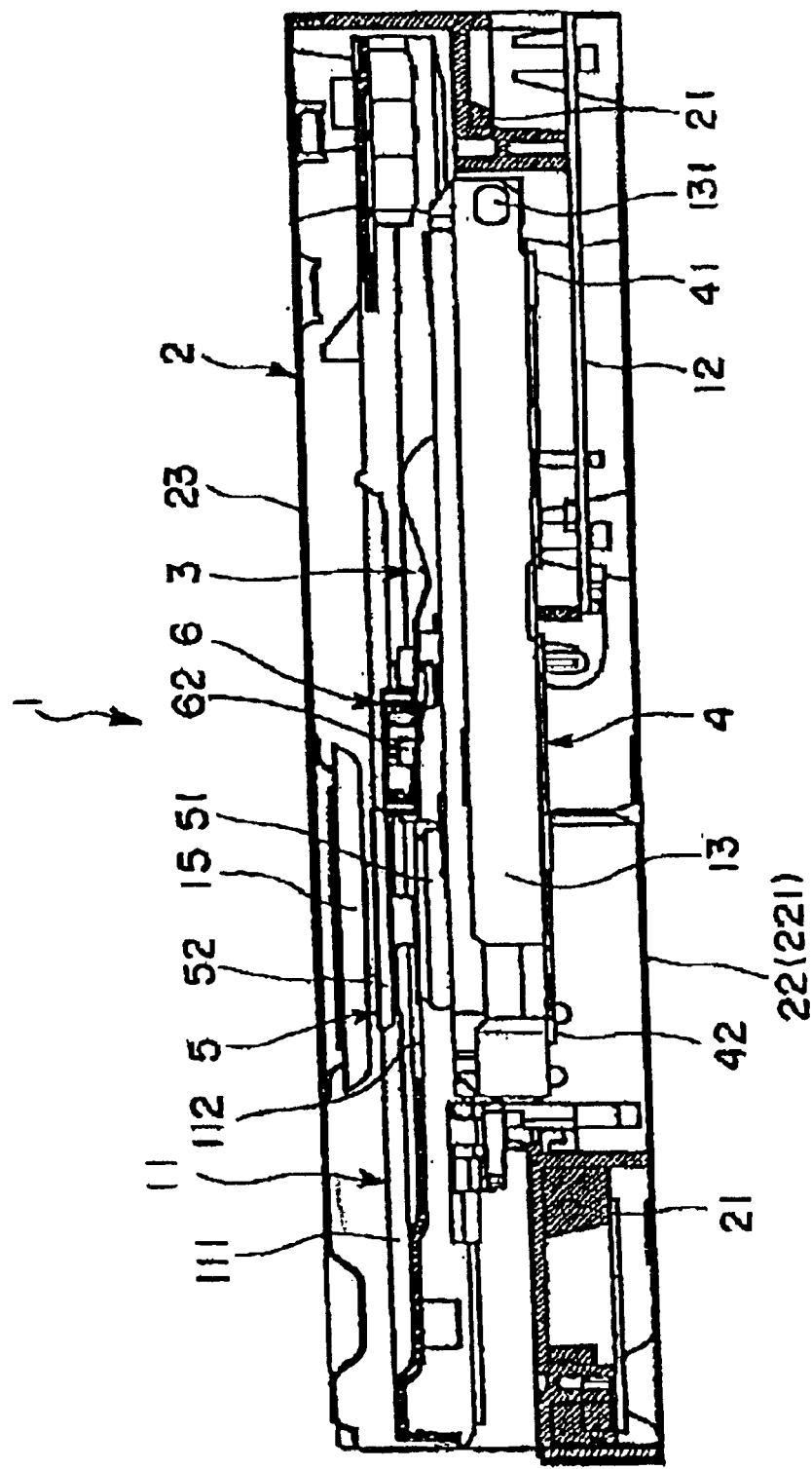
FIG. 4 is a cross-sectional side view of the disc drive shown in FIG. 1 which shows a loading state.
Figure 5:
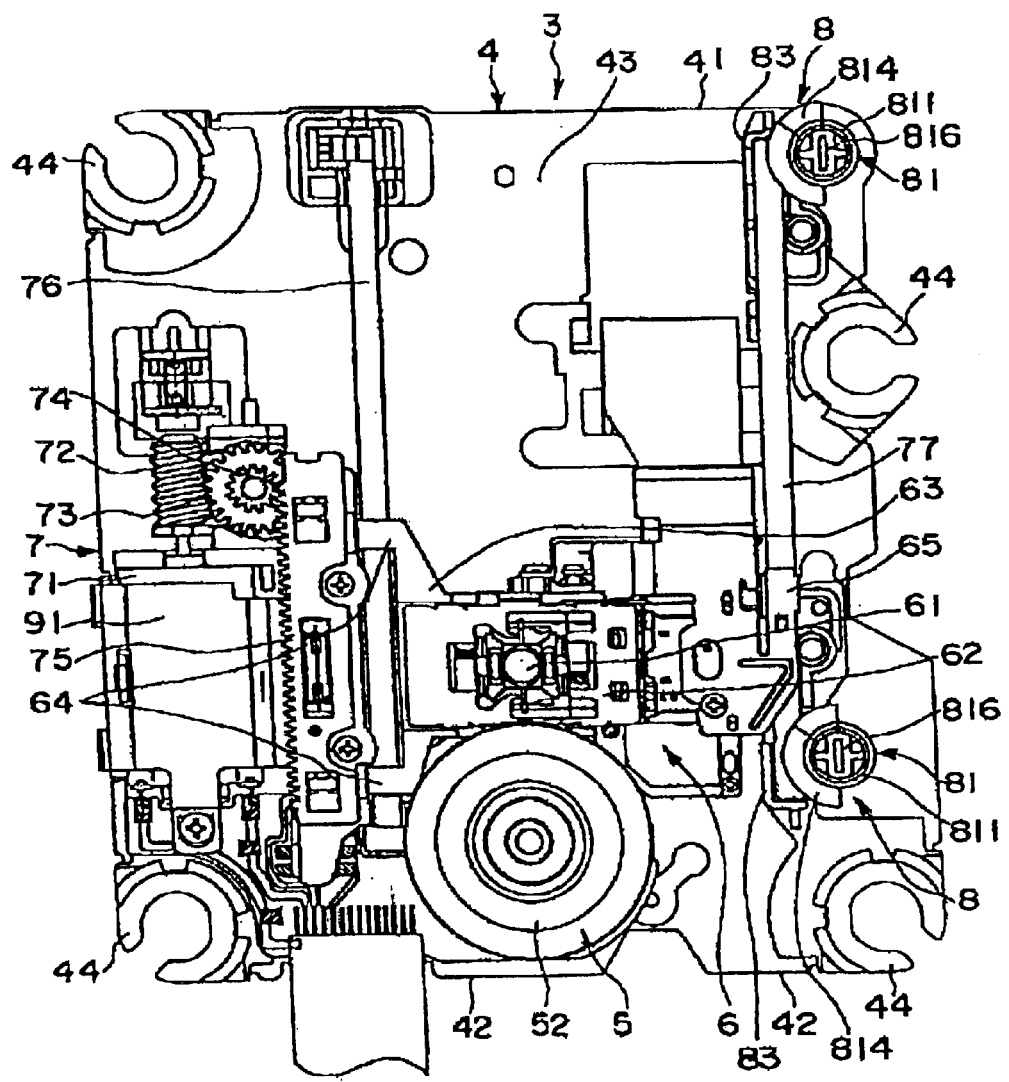
FIG. 5 is a plan view of a sled mechanism unit in the disc drive shown in FIG. 1.
Figure 6:
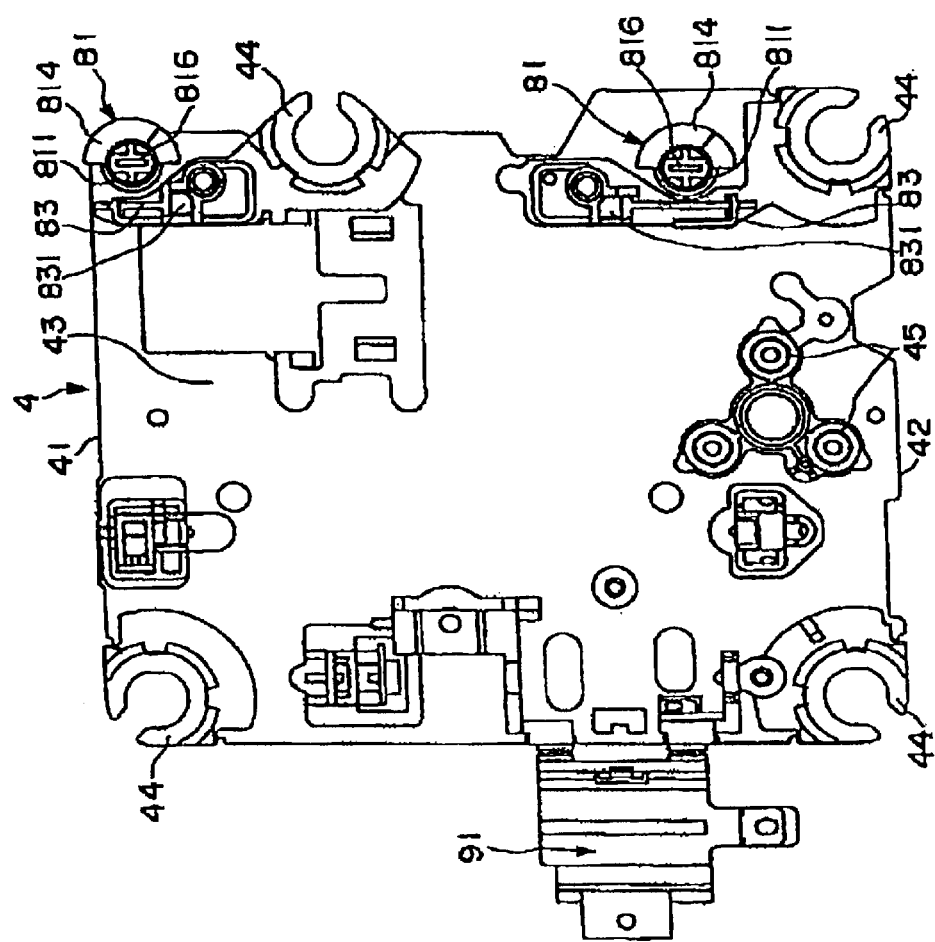
FIG. 6 is a plan view of a chassis before mounting an optical disc rotation drive mechanism, an optical pick-up, an optical pick-up moving mechanism and the like in the sled mechanism unit shown in FIG. 5.
Figure 7:
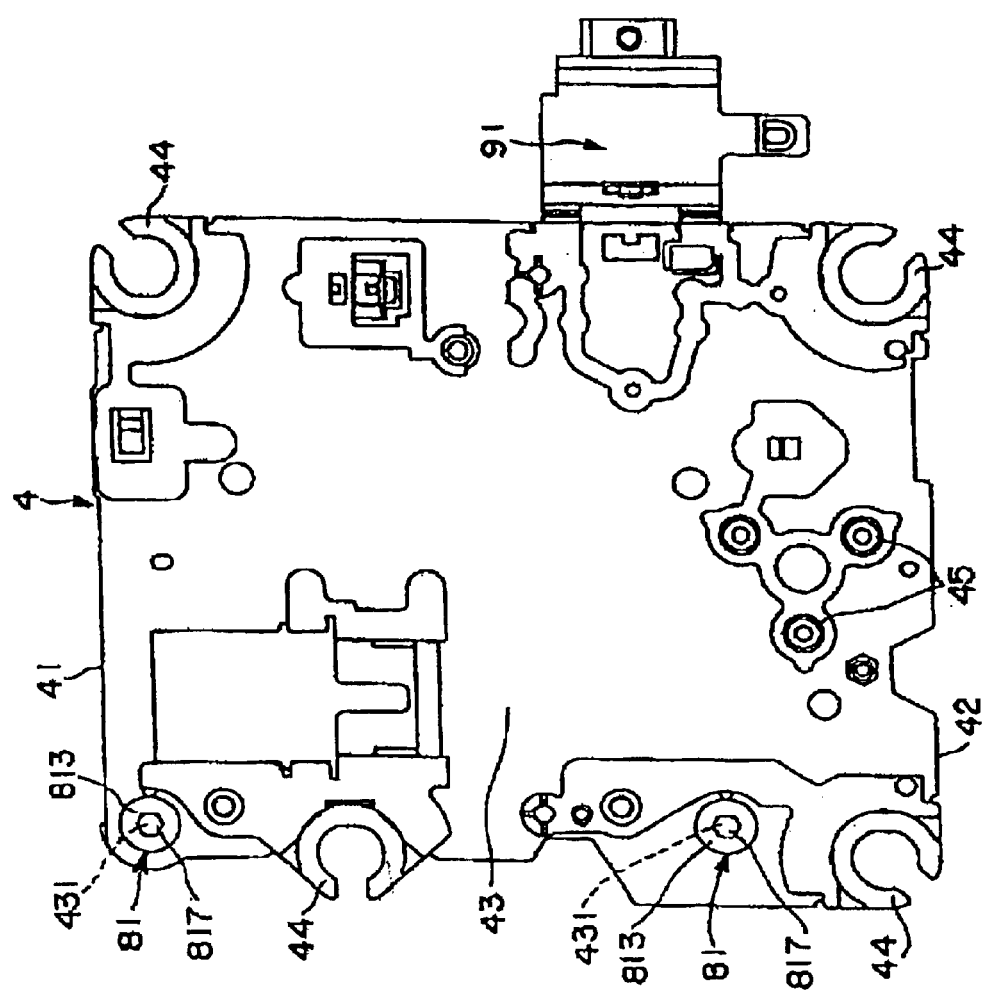
FIG. 7 is a bottom view of the chassis shown in FIG. 6.
Figure 8:
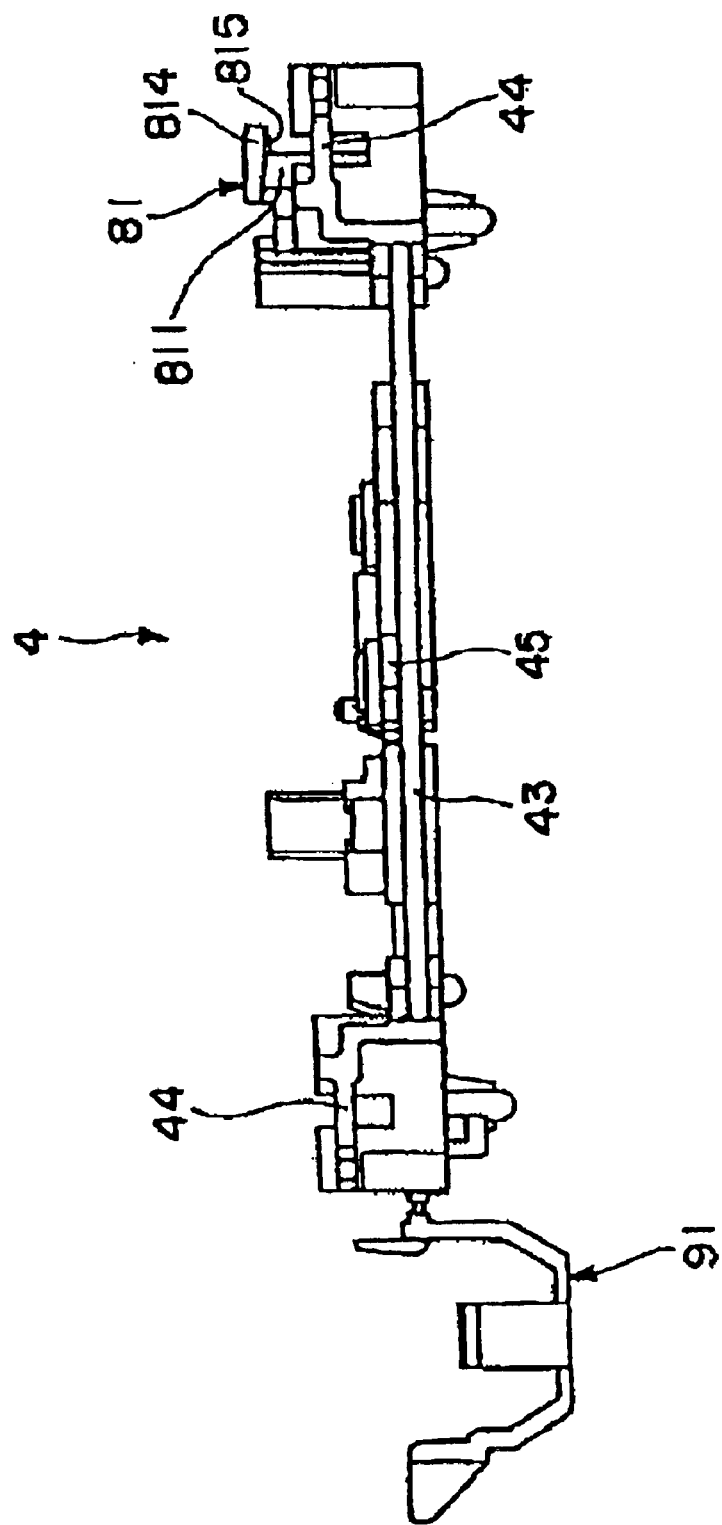
FIG. 8 is a front view of the chassis shown in FIG. 6.

FIG. 1 is a plan view of an embodiment of a disc drive according to the present invention, FIG. 2 is a plan view showing the disc drive of FIG. 1 in a state where the top plate has been removed, FIG. 3 and FIG. 4 are cross-sectional side views of the disc drive shown in FIG. 1, FIG. 5 is a plan view of a sled mechanism unit in the disc drive shown in FIG. 1, FIG. 6 is a plan view of a chassis before mounting an optical disc rotation drive mechanism, an optical pick-up, an optical pick-up moving mechanism and the like in the sled mechanism unit shown in FIG. 5, FIG. 7 is a bottom view of the chassis shown in FIG. 6, and FIG. 8 is a front view of the chassis shown in FIG. 6. Further, for the sake of convenience in the descriptions given below, the upper part in FIG. 2 and FIG. 3 and the right part in FIG. 4 is referred to as the "rear" or "rear part", and the lower part in FIG. 1 and FIG. 2 and the left part in FIG. 4 is referred to as the "front" or "front part".

A disc drive 1 shown in these drawings is an apparatus for playing back (reproducing) or recording and playing back data recorded on an optical disc such as a music CD, a CD-ROM, a CD-R, a CD-RW, a DVD or the like. For example, the disc drive 1 can be provided in a computer (not shown in the drawings) such as a personal computer or the like.

As shown in FIG. 1 to FIG. 5, the disc drive 1 is equipped with a main body 2, a disc tray 11 on which an optical disc (not shown in the drawings) is to be placed and which is movable in the forward and backward directions (horizontal direction) with respect to the main body 2, and a sled mechanism unit (disc drive unit) 3 provided inside the main body 2. The structure of each portion is described below.

The main body 2 includes a frame 21, a casing 22 which covers the bottom portion and the side portions of the frame 21, and a top plate (cover) 23 which covers the top portion of the frame 21.

The disc tray 11 and a drive mechanism thereof (not shown in the drawings), the sled mechanism unit 3, a main circuit board 12 and the like are mounted on the frame 21.

The casing 22 is fixed to the frame 21 by screws, for example, and the bottom portion of the frame 21 is covered by a bottom plate 221 of the casing 22. Further, the top plate 23 is fixed to the top portion of the frame 21 by screws, for example, and a space for receiving the disc tray 11 is formed between the frame 21 and the top plate 23.

Further, both the frame 21 and the disc tray 11 are formed from a resin material (plastic). Further, both the casing 22 and the top plate 23 are plate-shaped metal members formed into predetermined shapes by carrying out press forming or the like thereto.

The main circuit board 12 has a circuit for controlling all operations of the disc drive 1, and also includes an interface connector for making a connection with the computer, various integrated ICs such as a microprocessor, memories, a motor driver and the like, and various electric or electronic components such as resistors, capacitors, switches and the like.

The disc tray 11 has a shallow concave disc holding portion 111, and an optical disc (not shown in the drawings) is conveyed in a state where it is placed in the disc holding portion 111.

The disc tray 11 is driven by a driving mechanism (not shown in the drawings) provided on the frame 21, and moves (slides) in the forward and backward directions with respect to the main body 2. Namely, the disc tray 11 is movable between a position for loading (playing back or recording) an optical disc in the main body 2 (hereafter referred to simply as the "loading position" or "loading state") and a position for ejecting the optical disc (hereafter referred to simply as the "ejection position" or "ejection state"). When the disc tray 11 is at the loading position (the state shown in FIG. 4), all of the disc tray 11 is housed inside the main body 2, and when the disc tray 11 is at the ejection position (the state shown in FIG. 1 to FIG. 3), a major portion of the disc tray 11 is in an ejected (protruding) state outside the front end of the main body 2.

As shown in FIG. 2 to FIG. 4, a frame member 13 which supports the sled mechanism unit 3 is provided inside the main body 2. The frame member 13 has a roughly rectangular shape, and protruding shafts 131 are formed on both sides of the rear end portion of the frames member 13, respectively. The shafts 131 are supported in receiving portions formed in the frame 21 for enabling to pivotal movement. In this way, the frame member 13 can pivot around the shafts 131 with respect to the main body 2.

When driven by a loading mechanism not shown in the drawings, the frame member 13 is pivotally displaced between a posture roughly parallel with the top plate 23 and the bottom plate 221 in the loading state, and a posture in which the front end is displaced downward to be inclined with respect to the top plate 23 and the bottom plate 221 in the ejection state.

The sled mechanism unit 3 is positioned inside the frame member 13. The sled mechanism unit 3 is supported on the frame member 13 via four rubber bushings (elastic members) 14 which absorb vibration (see FIG. 2).

As shown in FIG. 5, the sled mechanism unit 3 is mainly constructed from a chassis (base) 4 and the optical disc rotation drive mechanism 5, the optical pick-up (optical head) 6 and the optical pick-up moving mechanism 7 which are provided (mounted) on the chassis 4.

The optical disc rotation drive mechanism 5 includes a spindle motor 51 and a turntable 52 fixed to the rotor of the spindle motor 51. The optical disc rotation drive mechanism 5 rotationally drives an optical disc placed on the turntable 52.

The optical pick-up 6 is equipped with an objective lens 61, an actuator 62 which drives the objective lens 61 in the optical axis direction (focusing) and a radial direction (tracking) of the optical disc, a laser light source, a light-converging optical system, a beam splitter (or half mirror), a light-receiving element for detecting data and for detecting focusing signals and tracking signals, and a support member 63 which supports these elements. In this structure, the reflected light of the laser light shining on the recording surface of an optical disc is guided to the light-receiving element via the objective lens, the beam splitter (or half mirror) and the like.

In the loading state, the objective lens 61 is exposed to the disc holding portion 111 and faces the recording surface of the optical disc through an opening 112 formed in the disc tray 11.

The pick-up base 63 is constructed from a metal material manufactured by die casting, for example. A pair of sliding portions 64 formed with holes through which a guide shaft 76 is inserted are formed on the left side of the pick-up base 63 in FIG. 5. Further, a sliding portion 65 which engages with and slides on a guide shaft 77 is formed on the right side of the pick-up base 63 in FIG. 5.

The optical pick-up moving mechanism 7 is constructed from a forward/reverse rotatable sled motor 71, a worm 72 fixed to the rotation shaft of the sled motor 71, a large-diameter gear 73 which meshes with the worm 72, a small-diameter gear 74 which is fixed to the large-diameter gear 73 to rotate on the same shaft, a rack gear 75 which is fixed to the pick-up base 63 to mesh with the small-diameter gear 74, and the pair of guide shafts 76 and 77 which define a moving path of the pick-up base 63 along which these elements are guided.

When the sled motor 71 is driven, the torque thereof is transmitted sequentially to the worm 72, the large-diameter gear 73, the small-diameter gear 74 and the rack gear 75, whereby the pick-up base 63 is moved along the guide shafts 76, 77 in a radial direction of the optical disc within a prescribed moving range. In this case, depending on the rotational direction of the sled motor 71, the pick-up base 63 moves in a direction approaching the center of rotation of the optical disc or in a direction moving away from the center of rotation.

The chassis 4 (sled mechanism unit 3) is pivotally displaceable with respect to both the frame member 13 and the main body 2. The shafts 131 at this center of pivotal motion are positioned near the rear end (one end) of the chassis 4. Namely, the rear end of the chassis 4 forms the center of pivotal motion, and therefore forms a rotation end 41 which undergoes almost no displacement with respect to the main body 2, and the front end (other end) of the chassis 4 forms a displacement end 42 which is displaced roughly in the upward and downward directions with respect to the main body 2.

In accordance with this structure, when the chassis 4 (sled mechanism unit 3) is in the loading state, the displacement end 42 is at a raised position (hereafter referred to simply as the "raised position") (see FIG. 4), and when the chassis 4 is in the ejection state, the displacement end 42 is at a lowered position (hereafter referred to simply as the "lowered position") (see FIG. 3).

At the raised position, the chassis 4 forms a posture roughly parallel to the top plate 23 and the bottom plate 221, and at the lowered position, the chassis 4 forms a posture inclined with respect to the top plate 23 and the bottom plate 221.

When the chassis 4 is at the raised position, the turntable 52 is protruded (exposed) to the inside of the disc holding portion 111 through the opening 112, and in this way, the optical disc loaded inside the main body 2 is placed on the turntable 52. In this state, a disc damper 15 which is rotatably provided on the inside of the top plate 23 is attracted to a magnet provided in the turntable 52, whereby the optical disc is held between the turntable 52 and the disc damper 15 (see FIG. 4).

When the chassis 4 is at the lowered position, the turntable 52 and a portion of the optical pick-up 6 and the like are positioned so as to not interfere with the disc tray 11 being moved to the ejection position (see FIG. 3).

As shown in FIG. 6 to FIG. 8, the chassis 4 includes a flat plate-shaped chassis base 43. The chassis base 43 has a roughly rectangular shape, and is constructed from a metal material such as stainless steel or the like, for example. The chassis base 43 is provided (equipped) with various elements such as rubber bushing mounting portions 44 for mounting the rubber bushings 14, a spindle motor fixing portion 45 for fixing the spindle motor 51, an adjustment member 81 which adjusts the height of the guide shaft 77, a holder member 91 which houses the sled motor 71, and the like.

The rubber bushing mounting portions 44, the spindle motor fixing portion 45, the adjustment member 81, the holder member 91 and the like are constructed from a synthetic resin material, and these members can be formed at the same time (one time) by carrying out outsert molding on the chassis base 43. There is no particular limitation to the synthetic resin material, and it is possible to use polyacetal, polybutylene terephthalate, polyphenylene sulfide and the like.

In this regard, "outsert moldings" refers to a method of providing (forming) functional parts on a base plate at one time by inserting the base plate made of metal, synthetic resin or the like between molding dies, and carrying out a single injection molding to form the functional parts on the base plate integrally at one time.

In the chassis 4, the chassis base 43 is a low-cost element having high rigidity and superior dimensional stability. The various members having the complex shapes described above are provided on the chassis base 43 by a single injection molding carried out by outsert molding described above. This makes it possible to achieve a reasonable reduction in cost with utilizing the characteristics of both the metal material and the synthetic resin material.

In the descriptions given below, the members provided on the chassis base 43 by outsert molding are referred to as outsert molded members.

Further, the sled mechanism unit 3 is provided with guide shaft height adjustment mechanisms 8 which adjust the distance (height) of the guide shaft 77 from the chassis 4. As shown in FIG. 5, the guide shaft height adjustment mechanisms 8 are provided near both end portions of the guide shaft 77. By adjusting the distances (heights) of both end portions of the guide shaft 77 from the chassis 4 using the two guide shaft height adjustment mechanisms 8, it is possible to adjust the tangential skew (the inclination of the beam direction orthogonal to the radial direction of the optical disc) of the optical pick-up 6.

Figure 9:
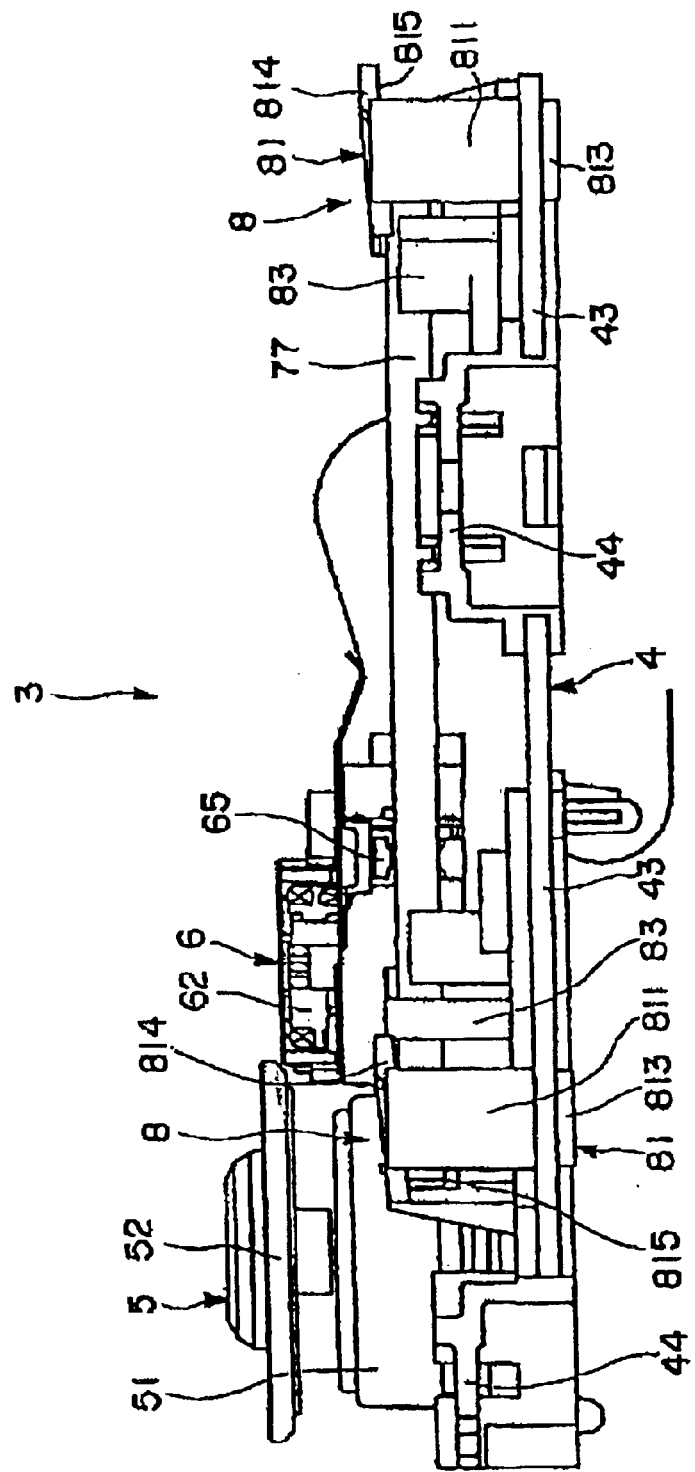
FIG. 9 is a right side view of the chassis shown in FIG. 5.
Figure 10:
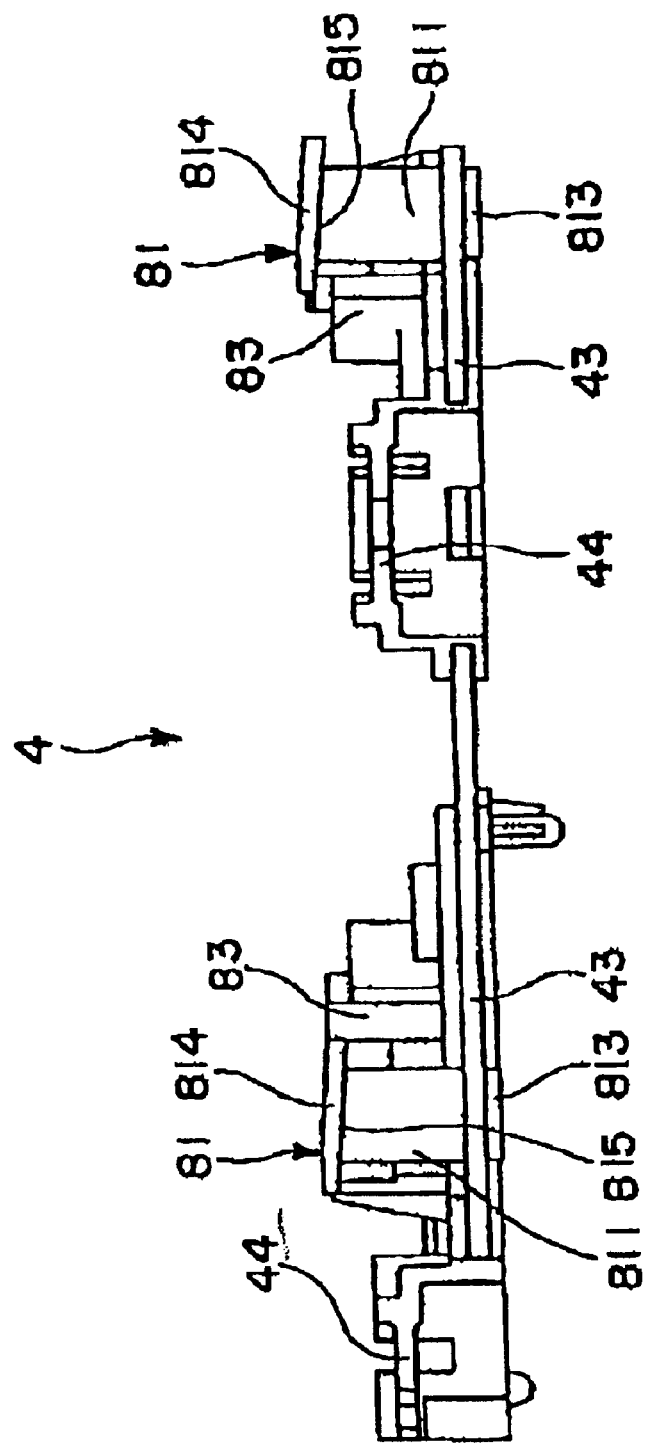
FIG. 10 is a right side view of the chassis shown in FIG. 6.
Figure 11:
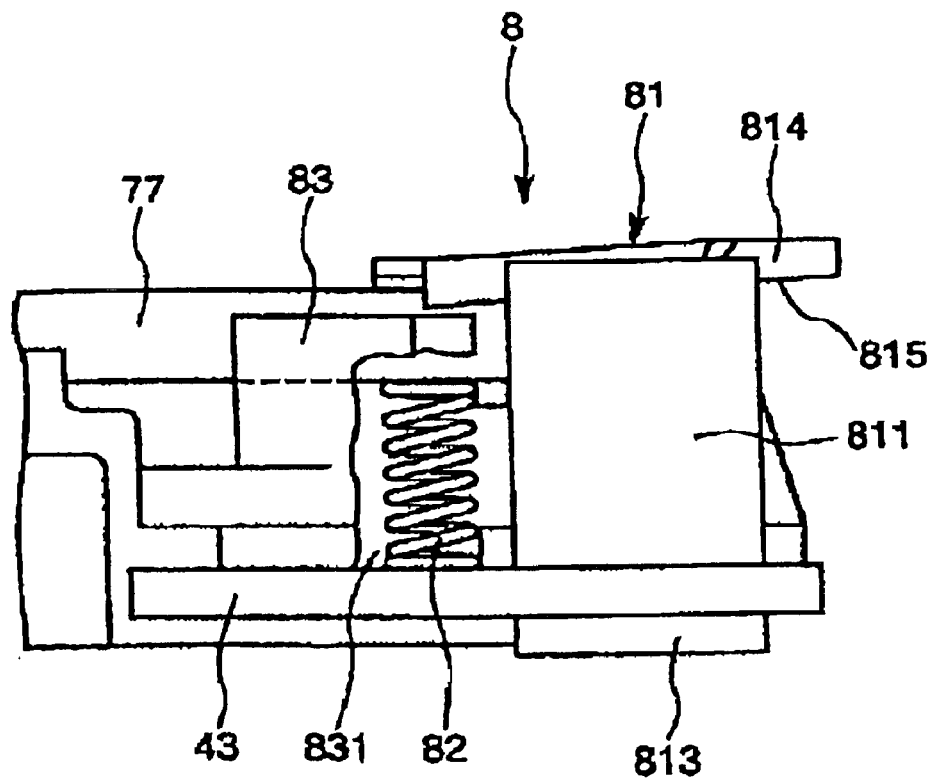
FIG. 11 is a partial cutaway side view of the guide shaft height adjustment mechanism in the sled mechanism unit shown in FIG. 5.
Figure 12:
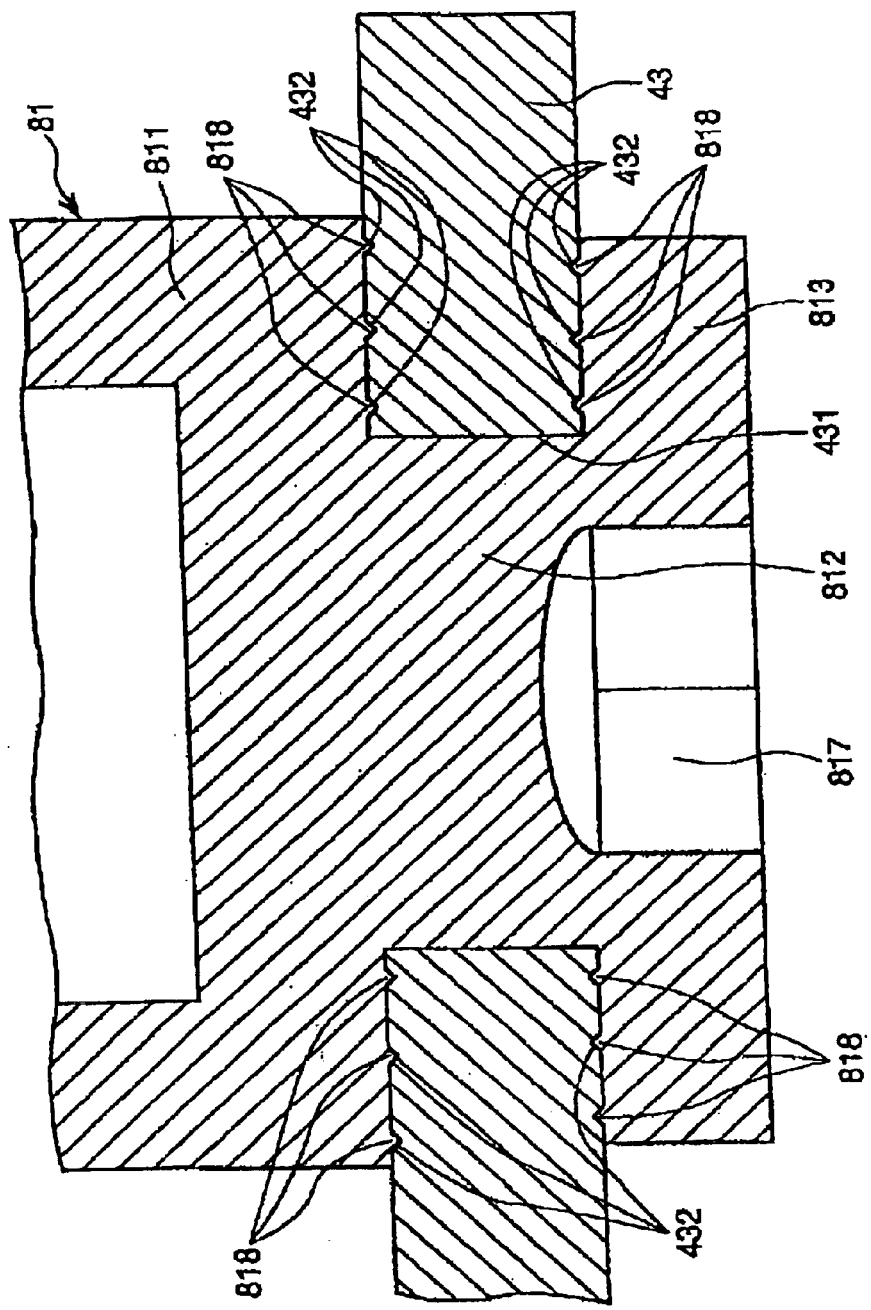
FIG. 12 is a vertical cross-sectional view of the vicinity of the lower end portion of the adjustment member in the guide shaft height adjustment mechanism shown in FIG. 11.
Figure 13:
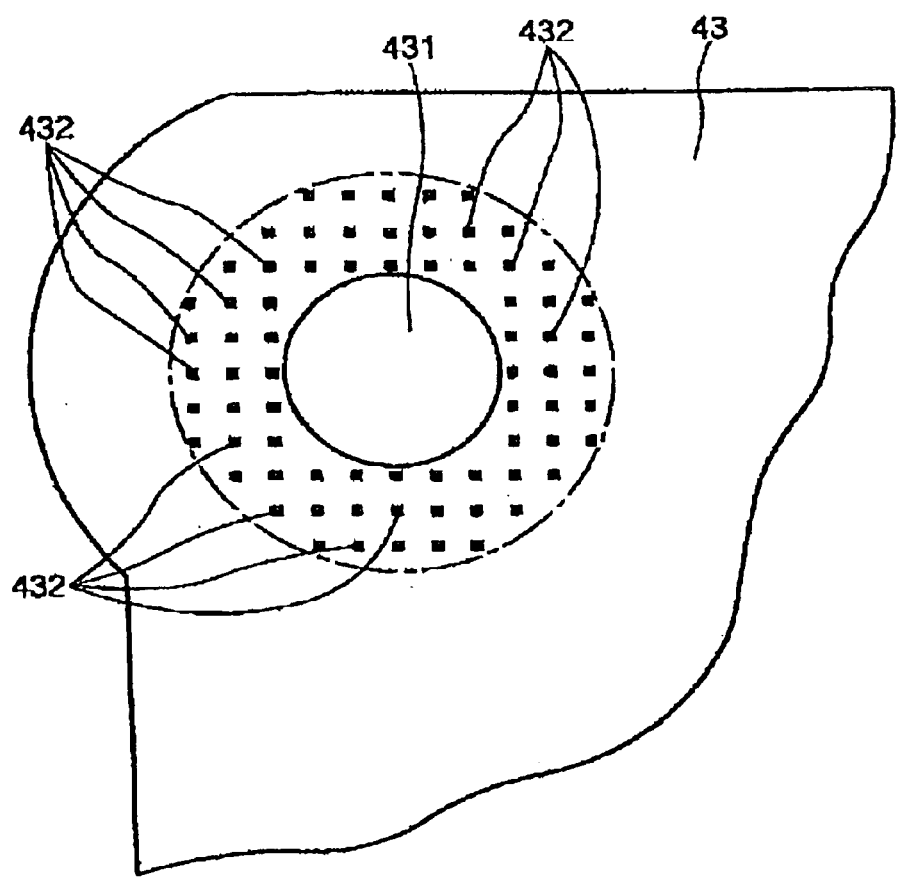
FIG. 13 is a bottom view of the vicinity of a hole portion of the chassis body before the adjustment member is provided.

FIG. 9 is a right side view of the sled mechanism unit shown in FIG. 5, FIG. 10 is a right side view of the chassis shown in FIG. 6, FIG. 11 is a partial cutaway side view of the guide shaft height adjustment mechanism in the sled mechanism unit shown in FIG. 5, FIG. 12 is a vertical cross-sectional view of the vicinity of the lower end portion of the adjustment member in the guide shaft height adjustment mechanism shown in FIG. 11, and FIG. 13 is a bottom view of the vicinity of a hole portion of the chassis body before the adjustment member is provided. Further, for the sake of convenience in the descriptions given below, the upper side in FIG. 9 to FIG. 12 is referred to as the "upper" or "upper part", and the lower side is referred to as the "lower" or "lower part".

The structure of the guide shaft height adjustment mechanisms 8 of the present invention will now be described with reference to FIGS. 1 to 12. In this regard, because the two guide shaft height adjustment mechanisms 8 have roughly the same structure, a representative description will be given for the guide shaft height adjustment mechanism 8 positioned near the rear end portion (the upper side in FIG. 5) of the guide shaft 77.

As shown in FIG. 9 and FIG. 11, the guide shaft height adjustment mechanism 8 includes the adjustment member (rotation member) 81 rotatably provided with respect to the chassis body 43, and a coil spring (biasing member) 82 which biases the rear end portion of the guide shaft 77 upward.

As shown in FIG. 5 and FIG. 6, the rear end portion of the guide shaft 77 can be positioned in a direction parallel to the chassis base 43 and displaced in a direction (the up and down directions) perpendicular to the chassis base 43 by a positioning member 83 fixed to the chassis base 43.

The coil spring 82 is housed in a compressed state inside a coil spring housing portion 831 formed in the positioning member 83. As shown in FIG. 11, the bottom end of the coil spring 82 abuts the top surface of the chassis base 43, and the top end of the coil spring 82 abuts the underside of the rear end portion of the guide shaft 77. In this way, the rear end portion of the guide shaft 77 is biased in a direction (upward) away from the chassis base 43.

The adjustment member 81 is formed by outsert molding at the position of a hole 431 formed in the chassis base 43, and is provided at the side of the rear end portion of the guide shaft 77. As shown in FIG. 10 and FIG. 12, the adjustment member 81 includes a roughly cylindrical portion 811 which is positioned at the upper side of the chassis base 43, an insertion portion 812 which is formed on the underside of the cylindrical portion 811 and which is inserted into the hole 431, and a bottom portion 813 which is formed to protrude in a ring shape to the peripheral side from the insertion portion 812 and which is engaged with the bottom surface of the chassis base 43. With this structure, the adjustment member 81 becomes rotatable around an axis concentric with the hole 431.

As shown in FIG. 5 and FIG. 11, an abutment portion 814 which abuts upper side of the rear end portion of the guide shaft 77 is formed on the top end portion of the cylindrical portion 811. The abutment portion 814 has a fan-shaped (a roughly semicircular-shaped) flange shape which extends radially from the cylindrical portion 811 over roughly half the circumference thereof. The rear end portion of the guide shaft 77 is pressed against the bottom surface (abutment surface 815) of the abutment portion 814 by the biasing force of the coil spring 82.

As shown in FIG. 10, the abutment surface (sliding surface) 815 is inclined with respect to the chassis base 43. In other words, the abutment surface 815 is not perpendicular with respect to the center axis of the adjustment member 81. In this way, when the adjustment member 81 is rotated, the abutment surface 815 slides with respect to the peripheral surface of the guide shaft 77, and because this changes the height (distance from the chassis body 43) of the abutment surface 815 of the portion in contact with the guide shaft 77, the height of the rear end portion of the guide shaft 77 is also changed. Accordingly, the height of the rear end portion of the guide shaft 77 can be adjusted by rotating the adjustment member 81.

As described above, the adjustment member 81 is provided on the chassis base 43 by outsert molding at one time together with the other outsert molded members, and for this reason the adjustment member 81 does not require a separate manufacturing operation. Accordingly, by providing this type of guide shaft height adjustment mechanism 8, the present invention makes it possible to reduce the cost of components when compared with the prior art structure in which a metal adjustment screw is prepared separately. Further, at the assembly time, because there is no need for the manual operation of screwing a adjustment screw in a screw hole of the chassis base, the assembly also becomes easy. Therefore, the guide shaft height adjustment mechanism 8 also makes it possible to reduce the manufacturing cost.

Further, in the guide shaft height adjustment member 8, because the positioning member 83 is also provided on the chassis body 43 by outsert molding at one time together with the other outsert molded members, the manufacturing cost is also reduced.

Further, in the adjustment member 81, the abutment portion 814 (abutment surface 815) is formed to protrude or extend in a fan shape to the peripheral side from the cylindrica portion 811 over roughly half the circumference thereof, and over the remaining roughly half circumference of the cylindrical portion 811, the abutment portion 814 (abutment surface 815) is not formed to form a cutaway portion (no abutment surface portion). As shown in FIG. 6, when the guide shaft 77 is mounted on the chassis 4, by rotating the adjustment member 81 to a position so that the no abutment surface portion is positioned at the guide shaft 77 side, the abutment portion 814 (abutment surface 815) will not form a hindrance (i.e., will not interfere). Accordingly, the guide shaft 77 can be mounted easily.

Further, the adjustment member 81 is outsert molded to have the shape shown in FIG. 6 with respect to the chassis base 43. For this reason, the mounting of the guide shaft 77 can be carried out in the state that the outsert molding has been completed. In this way, the guide shaft height adjustment mechanism 8 can be assembled by a simpler process.

Further, the formation range (the open angle of the fan of the abutment surface 815) of the abutment portion 814 (abutment surface 815) is not limited to roughly half the circumference (180°) of the cylindrical portion 811, and may be more than 180□ (e.g., 270°), or less then 180° (e.g., 120°). Further, the abutment portion 814 (abutment surf ace 815) may be formed over the entire circumference of the cylindrical portion 811.

Further, in the guide shaft height adjustment mechanism 8, by providing a biasing member such as the coil spring 82 underneath the guide shaft 77, and arranging the abutment portion 814 to abut the upper side of the guide shaft 77, the total height of the guide shaft adjustment mechanism 8 can be reduced when compared with the case of the reverse arrangement (i.e., a structure in which the guide shaft is biased downward by a biasing member provided on the upper side of the guide shaft, and pressed up by an abutment portion provided underneath the guide shaft).

As shown in FIG. 5, a groove (engagement portion) 816 which is adapted to engage with a screwdriver (that is a jig, such as a minus screwdriver) is formed in the cylindrical portion 811 of the adjustment member 81. In this way, the adjustment member 81 can be rotated using a screwdriver from the upper side of the chassis 4.

Further, as shown in FIG. 7, a concave portion (engagement portion) 817 adapted to engage with a hexagonal wrench is formed in a center portion of the bottom portion 813 of the adjustment member 81. By provision such a concave portion, the adjustment member 81 can be rotated using a hexagonal wrench from the underside of the chassis 4.

In this way, in the guide shaft height adjustment mechanism 8, the adjustment member 81 can be rotated from both the upper side and the underside of the chassis 4. Accordingly, when the height of the guide shaft 77 is adjusted, such adjustment can be carried out from the upper side or the underside of the chassis 4. Therefore, this has the advantage of increasing the arrangement freedom of the production line at the time the disc drive 1 is manufactured, and is also convenient when disassembling the disc drive 1 for repairs.

Further, the groove 816 and the concave portion 817 respectively engage with a screwdriver and a hexagonal wrench which are mutually different tools. Therefore, because it is possible to use either a screwdriver or a hexagonal wrench to rotate the adjustment member 81, the height adjustment of the guide shaft 77 can be carried out conveniently with either a screwdriver or a hexagonal wrench.

As shown in FIG. 12 and FIG. 13, a plurality (large number) of minute irregularities (concave protrusions) 432 are formed in the portion (inside the circle shown by the dashed line in FIG. 13) of the chassis base 43 which is in contact with the adjustment member 81. In the structure shown in the drawings, the minute irregularities 432 have roughly four-sided pyramidal shapes, respectively.

The minute irregularities 432 are formed by carry out a molding process (plastic processing) on the chassis 43. Further, the minute irregularities 432 may be formed (by what is generally referred to as "diamond pinching") at the time a pressing process is carried out to flatten the chassis base 43.

The formation density of the minute irregularities 432 has no particular limit, but about 50 to 200 concave portions per 1 cm² is preferred.

A plurality of minute irregularities (convex portions) 818 are formed in the portion (the bottom surface of the cylindrical portion 811 and the top surface of the bottom portion 813) of the adjustment member 81 which are in contact with the chassis base 43. The minute irregularities (convex portions) 818 are formed by injecting a resin material inside the irregularities (concave portions) 432 at the time the adjustment member 81 is formed by outsert moldings. In other words, the irregularities (convex portions) 818 are formed by copying the irregularities (concave portions) 432 at the time outsert molding is carried out.

By forming the concave portions (irregularities) 432 and the convex portions (irregularities) 818 in the manner described above, the rotational resistance of the adjustment member 81 is large as compared with the case where there are no concave portions 432 and convex portions 818. In this way, it is possible to prevent the adjustment member 81 from rotating naturally by vibration or shock when the disc drive 1 is transported or used. For this reason, after the adjustment member 81 is rotated to adjust the height of the guide shaft 77, there is no deviation of the height of the guide shaft 77 (inclination of the optical pickup 6) even when the adjustment member 81 is not fixed. Accordingly, in the manufacturing process of the disc drive 1, the manufacturing step of fixing the adjustment member 81 with an adhesive or the like, for example, can be omitted, and because this makes it possible to reduce the number of manufacturing steps and the cost of materials, it is possible to reduce the manufacturing cost.

Further, in the guide shaft height adjustment mechanism 8, because the adjustment member 81 is not fixed by an adhesive or the like, after the disc drive 1 is manufactured, it is easy to carry out height adjustment of the guide shaft 77 at the time the disc drive 1 is disassembled for repairs.

Further, in the structure shown in the drawings, the concave portions 432 are formed in both surfaces (the top surface and the bottom surface) of the periphery of the hole 431 of the chassis base 43, but the concave portions 432 may be formed on only one of these surfaces. Further, the concave portions 432 may be formed in other regions of the chassis base 43, or over roughly the entire chassis body 43.

Further, the rotational resistance of the adjustment member 81 can be easily adjusted to an appropriate size by appropriately adjusting the shape, size, number, formation region and the like of the concave portions 432.

Further, the structure in the drawings may be reversed by forming a plurality of minute convex portions on the chassis body 43, and forming minute concave portions which copy such convex portions in the adjustment member 81.

Further, the shapes of the concave portions 432 (or convex portions) have no particular limit, and may be rectangular, circular, hemispherical, cylindrical or the like, for example. Further, the concave portions 432 may be formed to have long thin shapes such as grooves or ridges, and such grooves or ridges may have a U-shaped or V-shaped cross section or the like.

The guide shaft height adjustment mechanism 8 described above is not limited to carrying out adjustment of the tangential skew of the optical pick-up 6, and by providing a guide shaft height adjustment mechanism 8 respectively at one end of the guide shafts 76 and 77, it is of course possible to also carry out adjustment of the radial skew (adjustment of the inclination of the beam in the radial direction of the optical disc) of the optical pick-up 6.

In the descriptions given above, the guide shaft height adjustment mechanism and the disc drive of the present invention were described based on the embodiments shown in the drawings, but the present invention is not limited to these embodiments, and it is possible to replace the components forming the guide shaft height adjustment mechanism and the disc drive with any other structural elements that exhibit the same function. Further, any desired structural elements may be added thereto.

As described above, because the height of the guide shaft is adjusted using an adjustment member formed by outsert molding in place of the metal adjustment screw, the present invention makes it possible to reduce the cost of components. Further, because there is no need for the manufacturing step of screwing an adjustment screw in a screw hole of the chassis at the assembly process, the present invention makes it possible to easily carry out assembly. Accordingly, the present invention makes it possible to reduce the manufacturing cost.

Further, in the case of the structure where the guide shaft and the contact surface are prevented from interfering with each other by forming a non abutment surface portion of the abutment surface in the adjustment member and rotating the adjustment member to a position where the non abutment surface portion is positioned at the guide shaft side, it becomes easy to mount the guide shaft, and this further reduces the manufacturing cost.

What is claimed is:

1. A guide shaft height adjustment mechanism, which comprises:
   a chassis comprised of a chassis base having a flat-plate shape and a hole;
   a guide shaft for guiding an optical pick-up along a radial direction of an optical disc, the guide shaft having one end acting as a movable end and being mounted on the chassis base so that the movable end can be displaced in a direction perpendicular to the chassis base;
   an adjustment member rotatably provided at the vicinity of the movable end of the guide shaft, the adjustment member being formed by outsert molding at the position of the hole formed in the chassis base; and
   a biasing member provided between the chassis base and the guide shaft at the vicinity of the adjustment member for pushing the guide shaft to a direction far away from the chassis base;
   wherein the adjustment member has an abutment surface at the vicinity of the movable end of the guide shaft, the abutment surface faces the chassis base so that the guide shaft is abutted thereto, and the abutment surface is formed so as to be inclined relative to the chassis base and extend along the circumferential direction of the adjustment member, in which the movable end of the guide shaft is in abutment with the abutment surface by the biasing force of the biasing member, and the distance between the movable end of the guide shaft and the chassis base can be adjusted by rotating the adjustment member.

2. The guide shaft height adjustment mechanism as claimed in claim 1, wherein the guide shaft has the other end which is also formed into a movable end, the adjustment member and the biasing member are also provided for the other movable end of the guide shaft so that the distance between each of the movable ends of the guide shaft and the chassis base can be adjusted.

3. The guide shaft height adjustment mechanism as claimed in claim 1, wherein the abutment surface is formed into a substantially sector shape.

4. The guide shaft height adjustment mechanism as claimed in claim 1, wherein the adjustment member is formed with a no abutment surface portion at a part of the circumferential direction thereof on which the abutment surface is not formed, in which by rotating the adjustment member to a position where the no abutment surface portion of the adjustment member is positioned on the side of the guide shaft, it is possible to obtain a state that the abutment surface does not interfere with the guide shaft.

5. The guide shaft height adjustment mechanism as claimed in claim 1, wherein the adjustment member has a flange-shaped abutment portion on which the abutment surface is formed.

6. The guide shaft height adjustment mechanism as claimed in claim 1, wherein the adjustment member is formed with an engaging part to which a jig is adapted to be engaged.

7. The guide shaft height adjustment mechanism as claimed in claim 1, further comprising a positioning member fixed on the chassis base (43) for positioning a position of the movable end of the guide shaft in a direction parallel to the upper surface of the chassis base (43).

8. The guide shaft height adjustment mechanism as claimed in claim 7, wherein the positioning member is formed on the chassis base (43) by outsert molding at the same time of the formation of the adjustment member.

9. The guide shaft height adjustment mechanism as claimed in claim 1, wherein the biasing member is a coil spring.

10. An optical disc drive having a function of playing back data recorded in an optical disc, the disc drive comprising:
    a chassis having a chassis base with a flat-plate shape and a hole;
    a guide shaft for guiding an optical pick-up along a radial direction of the optical disc wherein the guide shaft has one end acting as a movable end and is mounted on the chassis basis so that the movable end can be displaced in a direction perpendicular to the chassis base;
    an adjustment member rotatably provided at the vicinity of the movable end of the guide shaft wherein the adjustment member is formed by outsert molding at the position of the hole formed in the chassis base;
    and a biasing member provided between the chassis base and the guide shaft at the vicinity of the adjustment member for pushing the guide shaft to a direction far away from the chassis base wherein the adjustment member has an abutment surface at the vicinity of the movable end of the guide shaft wherein the abutment surface faces the chassis base so that the guide shaft is abutted thereto, and the abutment surface is formed so as to be inclined relative to the chassis base and extends along the circumferential direction of the adjustment member in which the movable end of the guide shaft is in abutment with the abutment surface by the biasing force of the biasing member, and the distance between the movable end of the guide shaft and the chassis base can be adjusted by rotating the adjusting member.

11. The optical disc drive of claim 10 wherein the guide shaft has the other end which is also formed into a movable end, the adjustment member and the biasing member are also provided for the other movable end of the guide shaft so that the distance between each of the movable ends of the guide shaft and the chassis base can be adjusted.

12. The optical disc drive of claim 10 wherein the abutment surface is formed into a substantially sector shape.

13. The optical disc drive of claim 10 wherein the adjustment member is formed with no abutment surface portion at a part of the circumferential direction thereof on which the abutment surface is not formed, in which by rotating the adjustment member to a position where the no abutment surface portion of the adjustment member is positioned on the side of the guide shaft, it is possible to obtain a state that the abutment surface does not interfere with the guide shaft.

14. The optical disc drive of claim 10 wherein the adjustment member had a flange-shaped abutment portion on which the abutment surface is formed.

15. The optical disc drive of claim 10 wherein the adjustment member is formed with an engaging part to which a jig is adapted to be engaged.

16. The optical disc drive of claim 10 further comprising a positioning member fixed on the chassis base for positioning a position of the movable end of the guide shaft in a direction parallel to the upper surface of the chassis base.

17. The optical disc drive of claim 16 wherein the positioning member is formed on the chassis base by outsert molding at the same time of the formation of the adjustment member.

18. The optical disc drive of claim 10 wherein the biasing member is a coil spring.

* * * * *

UNITED STATES PATENT AND TRADEMARK OFFICE
CERTIFICATE OF CORRECTION

PATENT NO. : 6,892,386 B2
DATED : May 10, 2005
INVENTOR(S) : Furuya et al.

It is certified that error appears in the above-identified patent and that said Letters Patent is hereby corrected as shown below:

Column 4,
Line 39, please change "frames" to -- frame --.

Column 8,
Line 52, please change "surf ace" to -- surface --.

Column 9,
Line 40, please change "pinching" to -- punching --.

Signed and Sealed this

Twelfth Day of July, 2005

JON W. DUDAS
*Director of the United States Patent and Trademark Office*